(12) United States Patent
Saint-Jalmes et al.

(10) Patent No.: US 8,517,307 B2
(45) Date of Patent: Aug. 27, 2013

(54) ADJUSTABLE PARTITIONING DEVICE ON AN AIRCRAFT

(75) Inventors: Bruno Saint-Jalmes, Toulouse (FR);
Jason Zaneboni, Blagnac (FR);
Bernard Rumeau, Cornebassieu (FR)

(73) Assignee: Airbus, Blagnac (FR)

(*) Notice: Subject to any disclaimer, the term of this patent is extended or adjusted under 35 U.S.C. 154(b) by 482 days.

(21) Appl. No.: 12/704,140

(22) Filed: Feb. 11, 2010

(65) Prior Publication Data
US 2010/0219292 A1 Sep. 2, 2010

(30) Foreign Application Priority Data

Feb. 11, 2009 (FR) ...................................... 09 00599

(51) Int. Cl.
*B64D 11/00* (2006.01)
*B64D 13/00* (2006.01)
(52) U.S. Cl.
USPC ........................................ 244/118.5; 160/102
(58) Field of Classification Search
USPC .......... 244/118.5, 118.6, 129.1, 129.4, 129.5; 160/95–97, 102, 110, 112, 333–339
See application file for complete search history.

(56) References Cited

U.S. PATENT DOCUMENTS

| 4,139,101 A * | 2/1979 | Towfigh ........................ 211/107 |
| 5,794,281 A * | 8/1998 | Shearon ............................ 4/558 |
| 6,292,957 B1 | 9/2001 | Thompson |
| 6,467,127 B1 * | 10/2002 | Goldstein ..................... 16/87 R |
| 6,523,779 B1 * | 2/2003 | Michel ........................ 244/118.5 |
| 7,104,305 B1 * | 9/2006 | Apollon ........................ 160/339 |
| 7,198,228 B2 * | 4/2007 | Mills et al. ................. 244/118.5 |
| 7,530,529 B2 * | 5/2009 | Bock .......................... 244/118.5 |
| 7,984,875 B2 * | 7/2011 | Koehn et al. ................ 244/118.5 |
| 8,123,165 B2 * | 2/2012 | Breuer et al. ............... 244/118.5 |
| 8,313,058 B2 * | 11/2012 | Saint-Jalmes et al. ..... 244/118.5 |
| 2001/0050519 A1 * | 12/2001 | Kasuya ........................ 312/315 |
| 2003/0066931 A1 | 4/2003 | Ward |
| 2005/0116098 A1 * | 6/2005 | Martens et al. ............ 244/118.5 |
| 2006/0054741 A1 * | 3/2006 | Mills et al. ................. 244/118.5 |
| 2006/0218717 A1 | 10/2006 | van den Bosch |
| 2007/0006377 A1 * | 1/2007 | Moore .............................. 4/558 |
| 2007/0006378 A1 * | 1/2007 | Moore .............................. 4/558 |
| 2008/0022451 A1 * | 1/2008 | Urlich et al. ..................... 4/610 |
| 2009/0065641 A1 * | 3/2009 | Koehn et al. ................ 244/118.5 |
| 2009/0242149 A1 * | 10/2009 | Breuer et al. .............. 160/368.1 |
| 2009/0242150 A1 * | 10/2009 | Mosler et al. .............. 160/368.1 |
| 2011/0094686 A1 * | 4/2011 | Kee et al. ...................... 160/102 |
| 2011/0114788 A1 * | 5/2011 | Mosler et al. .............. 244/118.5 |
| 2011/0272104 A1 * | 11/2011 | Dimitrakoudis .............. 160/188 |

FOREIGN PATENT DOCUMENTS

WO    WO 00/67623 A1    11/2000

* cited by examiner

*Primary Examiner* — Tien Dinh
*Assistant Examiner* — Michael A Fabula
(74) *Attorney, Agent, or Firm* — Oblon, Spivak, McClelland, Maier & Neustadt, L.L.P.

(57) ABSTRACT

An adjustable partitioning mechanism for an aircraft including a more or less straight upper rod of variable length and assumed to be horizontal. The ends of the rod are connectable so as to allow the rod to pivot around a vertical axis. The mechanism further includes a curtain that is attachable so as to cooperate with complementary attachments mounted on the rod. An aircraft can be equipped with at least one such partitioning mechanism.

15 Claims, 8 Drawing Sheets

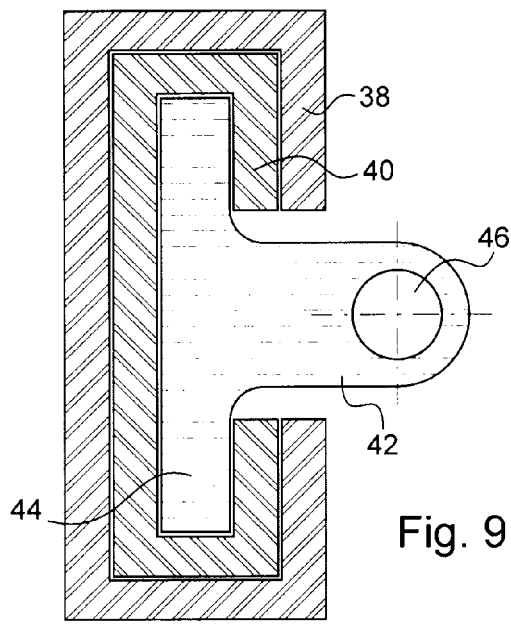
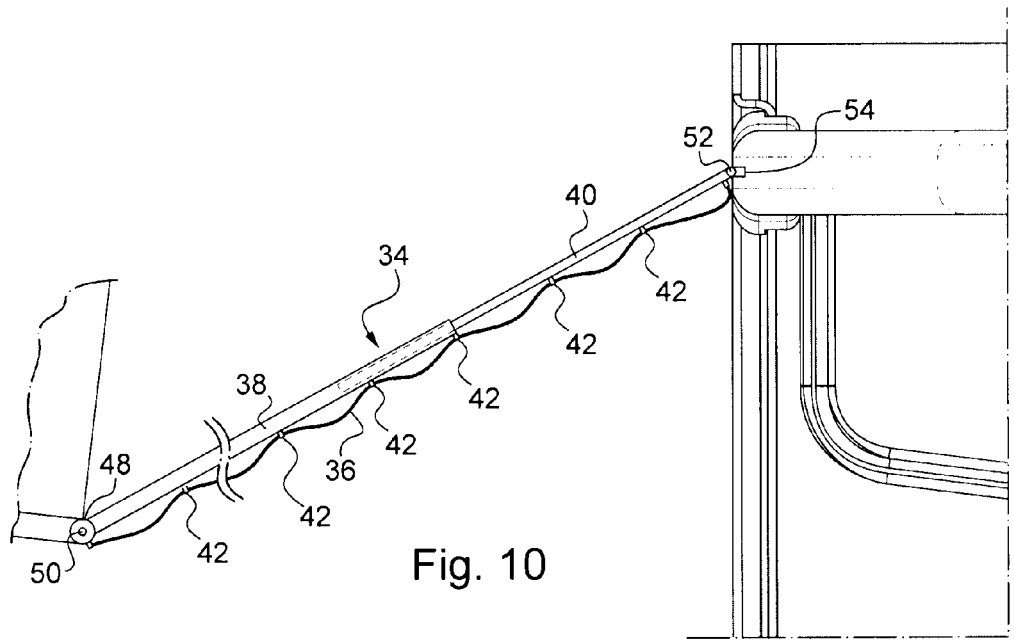

US 8,517,307 B2

ADJUSTABLE PARTITIONING DEVICE ON AN AIRCRAFT

TECHNICAL FIELD

This invention relates to a mechanism for adjustable partitioning intended in particular for an aircraft and more particularly for the layout of the rear portion of an aircraft.

BACKGROUND OF THE INVENTION

Aircraft intended for the transport of passengers, in particular those intended for long-haul flights, comprise a cabin accommodating the passengers. For the comfort of the passengers, kitchens, also called galleys, are provided in the cabin for storing and/or preparing meals and the serving of these meals is performed by the commercial flight personnel with the aid of carts, also called trolleys. The galleys and storage spaces for the trolleys are provided at various locations distributed in the cabin of the aircraft. In general, the rear of the cabin of such an aircraft, that is to say the space behind the last door of the aircraft, is laid out to accommodate trolleys and has a work space provided for preparing the meals intended to be carried by the trolleys.

As for document U.S. Pat. No. 7,198,228, it shows an aircraft rear-portion layout in which a fairly deep housing for accommodating at least two trolleys one behind the other is provided. This housing, in the embodiments shown, occupies more or less the entire available surface behind the last door of the aircraft. It also can be laid out in a rest space for accommodating the flight personnel.

It also is known to provide, at the rear of the aircraft, a compartment comprising a berth and thus allowing the commercial flight personnel to rest during long-haul flights. This compartment is arranged above the cabin accommodating the passengers, to the rear thereof. Stairs, or a ladder, allow(s) access to this compartment.

BRIEF SUMMARY OF THE INVENTION

At the rear of the aircraft there thus is a space planned at once for work and for rest for the commercial flight personnel. This invention has as a purpose to provide means allowing the commercial flight personnel to be isolated from the passengers during work phases as well as during rest phases. It is advisable, in particular, to provide a space making it possible to undress and dress before and after a rest period.

This invention has been implemented in the context of a layout of a rear portion of an aircraft, but the means provided by this invention can be used in an aircraft outside the rear portion thereof.

One purpose of this invention is to provide means making it possible to achieve a separation between the commercial flight personnel and the passengers, allowing these personnel on the one hand to work in peace without being disturbed by the passengers and also making it possible to achieve private spaces for the resting personnel.

The invention also has as a purpose to make it possible to adjust a space in an aircraft according to the flight phases and/or service requirements on board the aircraft.

To this end, this invention proposes an adjustable partitioning mechanism for an aircraft, characterized in that it comprises an upper rod of variable length, in that the rod comprises at its ends connection means allowing the rod to pivot around an axis, and in that it further comprises a curtain having attachment means intended to cooperate with complementary attachment means mounted on the rod.

In this way, such a partitioning mechanism can be adapted in length and thus be arranged between a fixed element and a movable element making the corresponding space adjustable.

By curtain there is understood here a removable partition mechanism, which can be folded. It thus can involve a flexible element, or a set of rigid elements, for example slats, movable among themselves so as to be able to be opened out and folded back.

According to a first embodiment, the rod has a more or less straight form. It also is conceivable, however, to have a curved rod, for example in the form of an arc of a circle. In the case of a straight rod, the connection means allowing the rod to pivot preferably make it possible to implement a pivoting around an axis more or less perpendicular to the longitudinal direction of the rod. In that way, when the rod is arranged in a horizontal plane, it then can pivot around a vertical axis while remaining, during this pivoting, in its horizontal plane; that is to say, if the rod is against a flat ceiling, it can pivot parallel to this ceiling.

By way of illustration, this invention proposes an embodiment of the rod in which the latter comprises a main C-shaped sectional element and a secondary C-shaped sectional element mounted sliding in the main sectional C-shaped element, and fastening cramps are mounted sliding in each sectional C-shaped element in order to allow attachment of the curtain, for example a flexible curtain. In this way, the rod is a telescopic rod the length of which is adaptable by having the secondary sectional element slide inside the main sectional element. In such an embodiment, it can be provided that each C-shaped sectional element has at one end means intended to cooperate with complementary outside means in order to implement a pivot connection around an axis.

In order to permit a better support of the curtain, the curtain according to the invention has, for example, fastening means arranged on the side opposite the means for attachment to the rod. These fastening means then make it possible to interlock the bottom of the curtain with fixed elements in the aircraft. Various means can be used here, such as, for example, a simple link, a hook-and-loop system (more widely known under the registered trademark Velcro), pressure buttons, magnets cooperating with metal parts, etc.

In an advantageous embodiment of a partitioning mechanism according to the invention, on at least one of the ends of the rod, its connection means can be removed so as to be able to move the corresponding end of the rod. When one end is removed in this way, the rod can pivot in a more or less horizontal plane around the pivot connection located at the other end of the rod.

This invention also relates to an aircraft, characterized in that it comprises on the one hand at least one partitioning mechanism such as described above and on the other hand connection means complementary to the connection means of the rod so as to implement a pivot connection.

Such an aircraft comprises, for example, in standard manner, a cockpit, a cabin intended to accommodate passengers, doors for access to the said cabin and a space laid out behind the last access door, that is to say on the side opposite the cockpit. The said space laid out can comprise a central island surrounded by passageways. In such a configuration, a partitioning mechanism advantageously connects the central island to an opposite wall so as to be able to form a partition across a passageway surrounding the central island. In this way, it is possible to isolate the space arranged behind the last door for access to the cabin from the rest of the cabin. In order to adjust the space arranged behind the last access door, the central island comprises, for example, a movable wall, and at least one partitioning mechanism is mounted at one of its ends on the movable wall of the central island.

An aircraft comprising a central island such as described above also can comprise a monument facing the central island and separated from the latter by a transverse passageway, the monument comprising stairs for access to a rest compartment. In this configuration, two partitioning mechanisms according to the invention advantageously are provided between the central island and the monument so as to make it possible to close off the passageway between the central island and the monument at its two ends. In this way, it is possible to create a changing room on the one hand between the monument and the central island and on the other hand between the two partitioning mechanisms. For such a use of the partitioning mechanisms, the latter preferably are movable so that they each can, in a first position, close off the passageway between the monument and the central island and a second position folded back along the monument. In this way, in their opened-out position, the partitioning mechanisms contribute to forming, for example, a changing room, while in their folded-back position they can close off the access to the monument stairs.

More generally, this invention also relates to an aircraft that comprises a monument comprising stairs for access to a rest compartment, this monument not necessarily being placed at the rear of the aircraft. In this case, the stairs open into an aisle running alongside the monument, and advantageously, two partitioning mechanisms according to this invention are provided so as to make it possible to close off, at its two ends, the aisle into which the stairs open. Here also, one manages to create a private space, which can be used as a changing room, for the commercial flight personnel. Here also, the partitioning mechanisms are movable so that each is able, in a first position, to close off the aisle at its ends and a second position folded back along the monument.

BRIEF DESCRIPTION OF THE DRAWINGS

Details and advantages of this invention will become more apparent from the description that follows, presented with reference to the attached schematic drawings, on which:

FIG. 9 is a view in cross-section of a rod of a partitioning mechanism according to the invention, FIG. 10 is a view from above of a partitioning mechanism showing this mechanism in greater detail.

DETAILED DESCRIPTION

Figure 1:
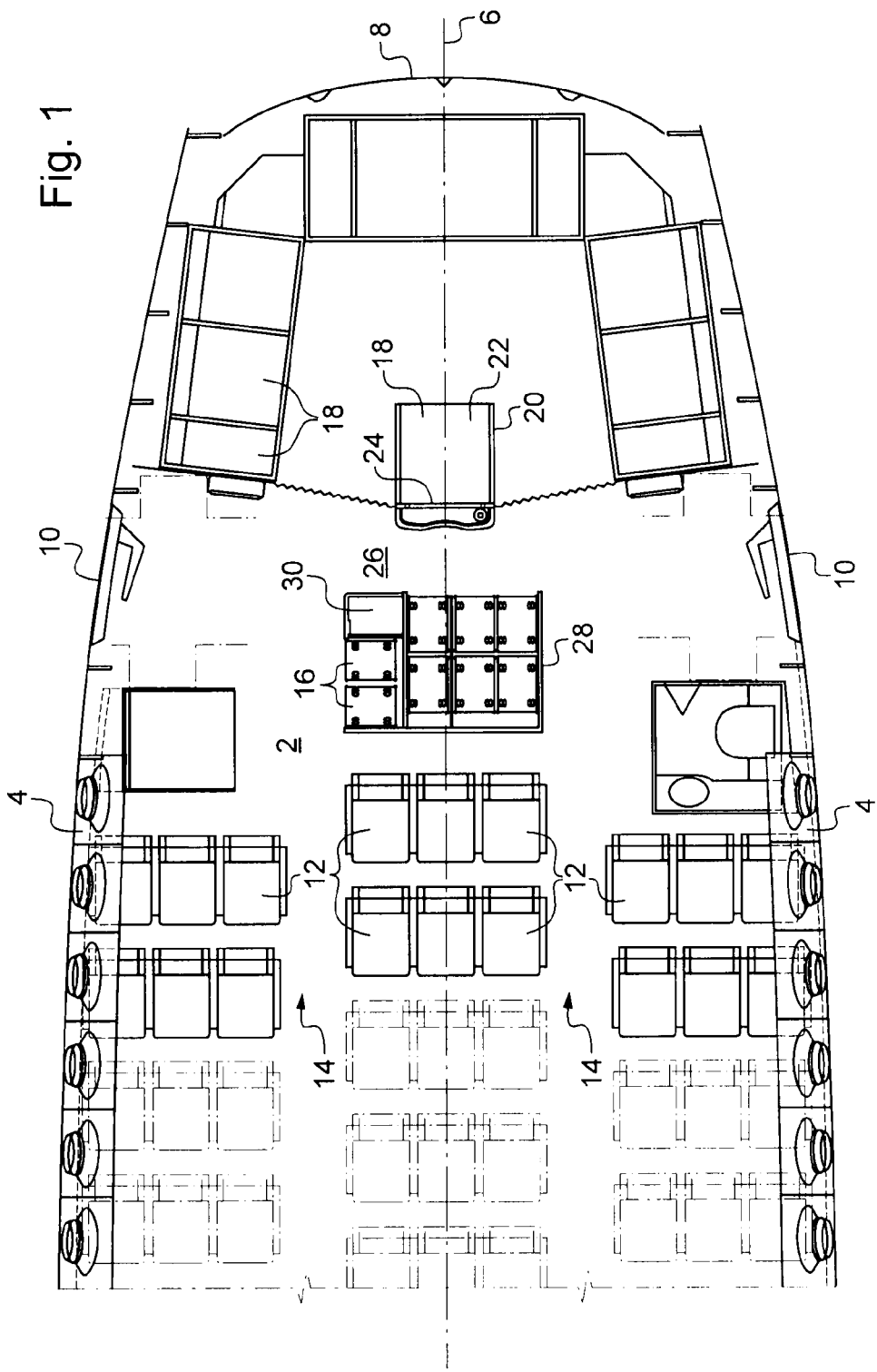
FIG. 1 is a view from above of a rear portion of a cabin of an aircraft according to the invention.
Figure 2:
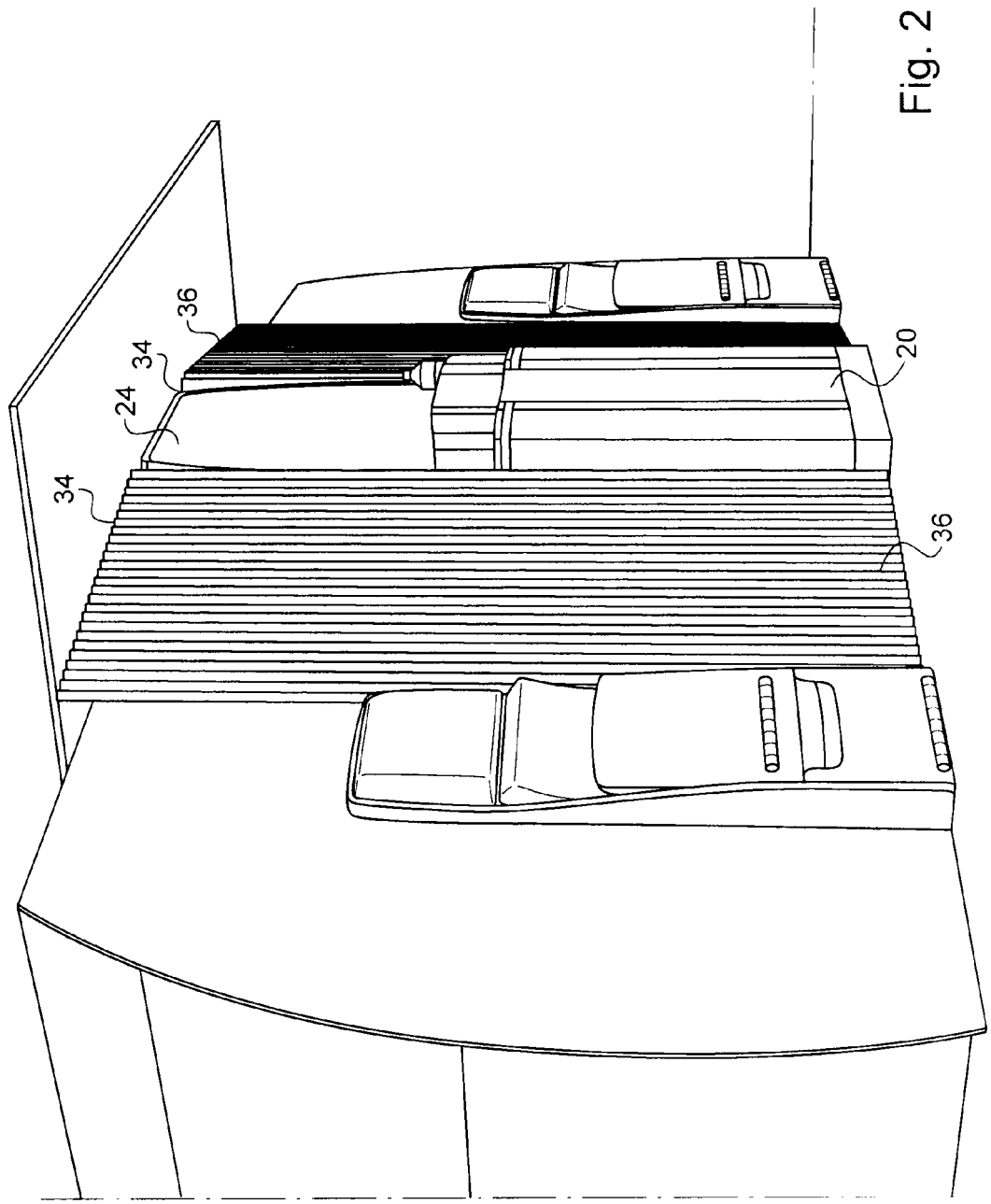
FIG. 2 shows in perspective two partitioning mechanisms according to the invention, also visible on FIG. 1.
Figure 3:
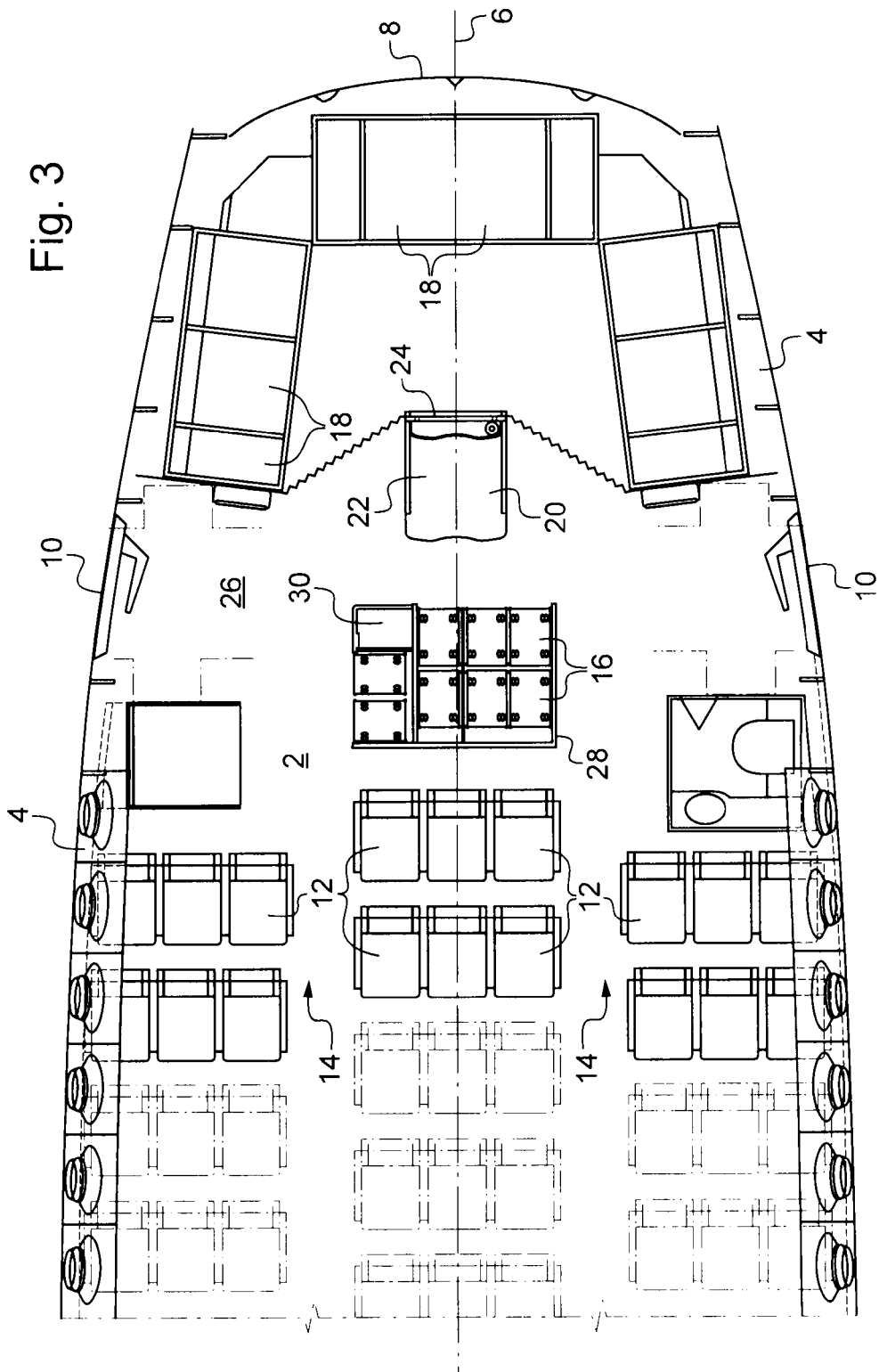
FIG. 3 is a view from above corresponding to FIG. 1 in another configuration.

FIGS. 1 and 3 show a rear portion of a cabin of an aircraft intended for the transport of passengers. Here it concerns an aircraft of the type of those commonly used by the airline companies for the transport of passengers over long distances. Such an aircraft generally allows transport of a least one hundred passengers, for example at least two hundred passengers. It is assumed here that it concerns an aircraft of single-deck type, comprising a main deck on which there is laid out at the front of the aircraft a cockpit (not shown) in which the pilots are seated for flying the aircraft. A passenger cabin is laid out behind the cockpit as far as the rear of the aircraft. FIGS. 1 to 8 show the portion of the passenger cabin located at the end of the main deck facing the cockpit. In standard manner, a hold (not shown) is provided underneath the main deck.

The passenger cabin is delimited by a floor 2, by a cabin wall 4 and by a ceiling (not shown). The floor 2 is considered hereinafter as being more or less plane and horizontal. As for the cabin wall 4, it extends more or less vertically and is curved, as the individual skilled in the art knows.

The cabin extends longitudinally in relation to a longitudinal axis 6 (FIGS. 1 and 3) of the aircraft. The cabin wall 4 comprises side walls that correspond to the fuselage of the aircraft and, on the side facing the cockpit, the cabin wall 4 is formed by a partition extending more or less crosswise in relation to the axis 6 and referred to as impervious partition 8. The latter separates the cabin from a non-pressurized technical compartment arranged in the rear end of the fuselage, also referred to as rear cone of the aircraft.

The cabin wall 4 comprises several doors allowing access to and evacuation from the passenger cabin. These doors are distributed along the cabin. There generally is designated by the term "door" a set of two doors facing each other and arranged on both sides of the cabin, symmetrically in relation to the longitudinal axis 6 of the aircraft. On FIGS. 1 and 3 there thus has been shown the last door 10 of the aircraft, that is to say the door (i.e. the pair of doors) located the farthest back in relation to the longitudinal axis 6 of the aircraft, or else, expressed differently, the farthest away from the cockpit.

In standard manner, the passenger cabin has seats 12 fastened on the floor 2. In the embodiments shown, seats 12 are grouped in threes, thus forming transverse rows of seats arranged one behind the other and two aisles 14 thus separate groups of rows of seats.

This description concerns more particularly the layout of the cabin of the aircraft behind the last door 10. This space is a work and storage space for the commercial flight personnel. Indeed, during travel in an aircraft, particularly during long-haul flights, beverages and meals are offered to the passengers. It is appropriate, therefore, to provide areas for storing the beverages and foodstuffs and for preparing them before serving them. These storage and preparation spaces generally are referred to by the English term "galley," translated as kitchen. The meals prepared in the galley then are arranged with beverages on carts (also referred to as trolleys) for service to the passengers. These trolleys, or demi-trolleys 16, are stored in housings 18 when they are not being used. The depth of each of the housings 18 corresponds more or less to the length of a trolley or of two demi-trolleys 16.

Figure 4:
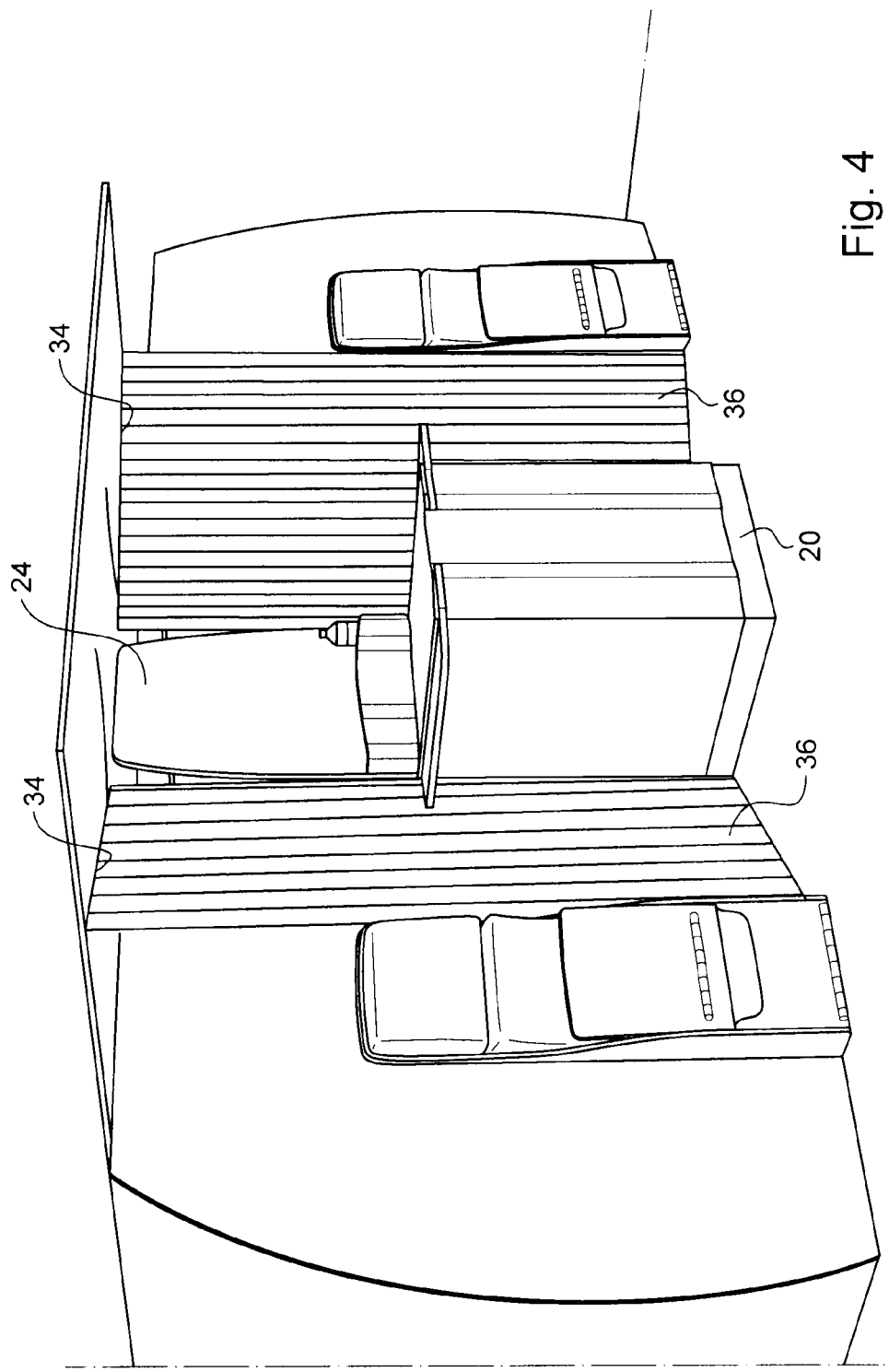
FIG. 4 shows in perspective the two partitioning mechanisms of FIG. 2 in the configuration shown on FIG. 3.

In the aircraft considered here, housings 18 are arranged in the rear portion of the aircraft, behind the last door 10 along walls 4 of the cabin as well as along the impervious partition 8. In the central portion there also is observed the presence of a unit in which there is located a housing 18 (provided here for two trolleys in the embodiment shown on the drawings) and which is referred to hereinafter as central island 20. In fact, this unit is bordered on each of its faces by an aisle or a passageway. Moreover, this unit has a tray 22 that can serve as a work surface (FIGS. 1 and 2) or as a bar counter (FIGS. 3 and 4). A movable partition 24 tops this unit, extending on the one hand over the entire length of this unit and on the other hand from the tray 8 up to the ceiling of the cabin.

In the embodiment of the aircraft chosen to illustrate this invention, a transverse aisle 26 is provided at the door 10. This transverse aisle 26 borders the central island 20 on one side. In this aircraft rear portion, there also is seen the presence of a monument 28 (term used to designate an element fastened to the floor in the layout of an aircraft cabin). This monument 28 comprises, for example, an access to a rest compartment (not shown) arranged in the upper portion of the cabin, above the seats 12. Stairs 30 make it possible, for example, to reach a vestibule providing access to one (or more) berth(s) arranged in the upper portion of the cabin. The space arranged underneath the raised vestibule then allows storage of trolleys or demi-trolleys 16.

On FIGS. 1 and 2, two partitioning mechanisms are provided for separating the passengers from the commercial flight personnel during, for example, the preparation of meals and service. In usual manner, for the comfort and tranquility of the passengers, just as for the personnel who are working, a separation is provided between the passengers and the flight personnel. In the first configuration of FIGS. 1 and 2, the partitioning mechanisms are arranged along the transverse aisle 26 so as to close off the access in the portion laid out behind the last door 10 and intended for accommodating the trolleys and preparing them. It is observed that each partitioning mechanism connects the central island 20 to a monument arranged along the wall 4 of the cabin and intended for the storage of trolleys. Each partitioning mechanism here is connected at one if its ends to the movable partition 24 of the central island 20 and at its other end to the corner formed by transverse aisle 26 and the access to the rear portion of the aircraft laid out in particular for the housing of trolleys.

The partitioning mechanisms shown are adjustable mechanisms that can be used for several configurations as illustrated on the drawings. In this way the same partitioning mechanisms are used in the configurations of FIGS. 3 and 4. In comparison with the preceding configuration of FIGS. 1 and 2, movable partition 24 of central island 20 was shifted. Whereas in FIGS. 1 and 2 this movable partition 24 is shown in a position brought forward toward the front of the aircraft, in FIGS. 3 and 4 it is shown in a position moved-back toward the rear of the aircraft. In this way, tray 22 of the central island that serves as a work surface for the flight personnel (FIGS. 1 and 2) now is transformed into a bar counter for the passengers while preserving the separation between the space intended for the passengers and that reserved for the commercial flight personnel.

Figure 5:
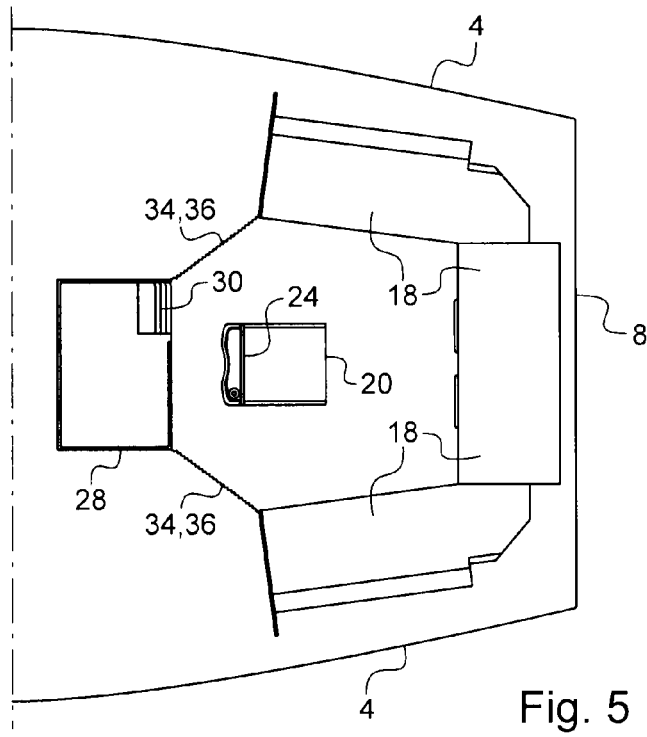
FIG. 5 is a view from above simplified by comparison with FIGS. 1 and 3 showing the rear portion of the same aircraft in a third configuration.
Figure 6:
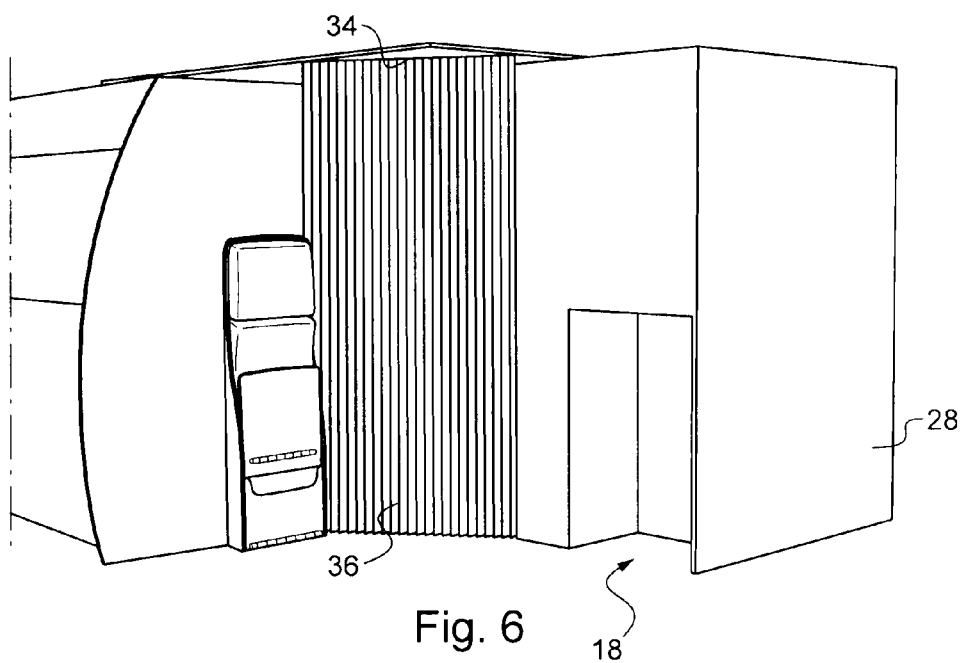
FIG. 6 is a perspective view corresponding to the views of FIGS. 2 and 4 for the third configuration of FIG. 5.

FIGS. 5 and 6 illustrate by way of additional example another configuration that can be obtained with the same partitioning mechanisms as those shown on FIGS. 1 to 4. In this configuration, the partitioning mechanisms are connected at one of their ends, as in the two preceding configurations, to the corner formed by the transverse aisle 26 and the access to the rear portion of the aircraft laid out in particular for the housing of trolleys. As for the other end of each partitioning mechanism, here it is connected to a corner of monument 28.

Figure 7:
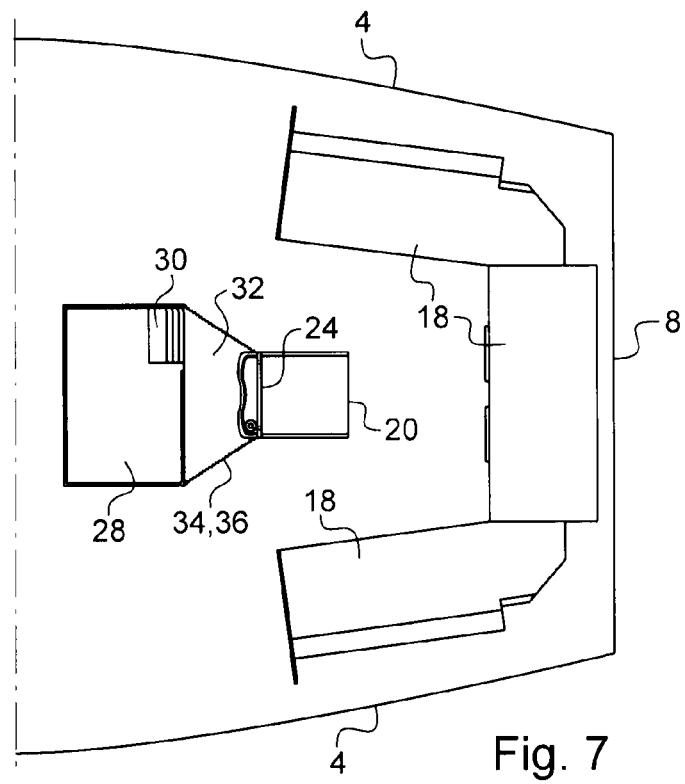
FIG. 7 is a view from above corresponding to the view of FIG. 5 and showing the rear portion of the same aircraft in a fourth configuration.
Figure 8:
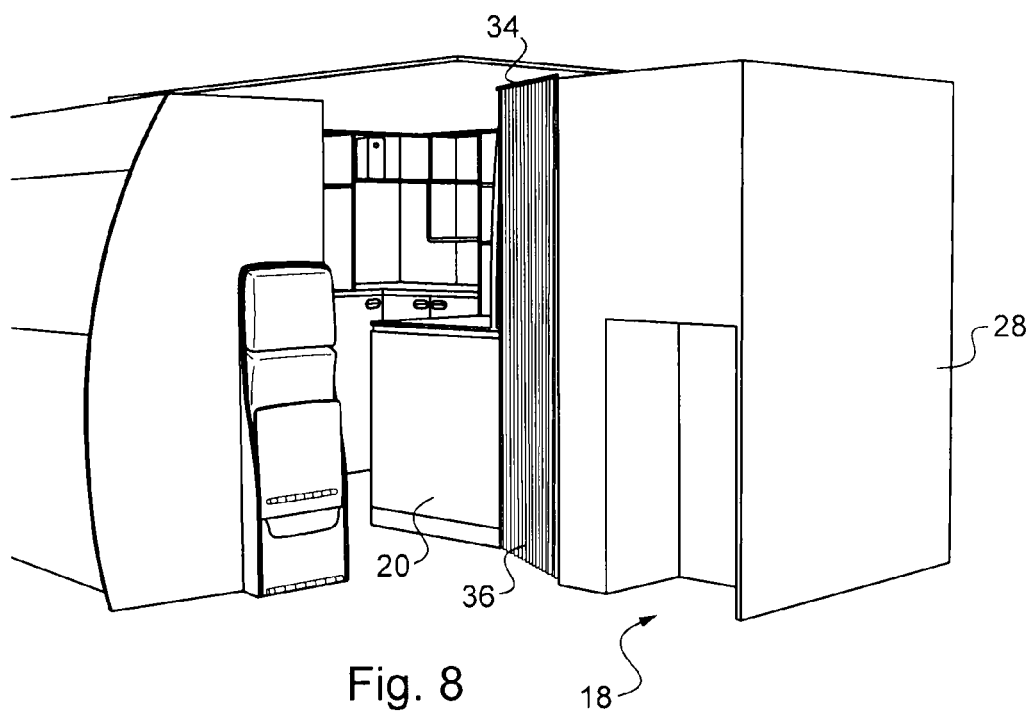
FIG. 8 is a perspective view corresponding to the views of FIGS. 2, 4 and 6 for the fourth configuration of FIG. 7.

FIGS. 7 and 8 show a fourth configuration that can be obtained still with the same partitioning mechanisms. In this configuration, the partitioning mechanisms connect the central island 20, and more precisely the movable partition 24 of the central island to an angle of the monument 28. In this way there is formed in transverse aisle 26 an isolated space 32 of trapezoidal shape in front of stairs 30. In this configuration, the partitioning mechanisms thus close the access to the aisle into which the stairs 30 open. This isolated space 32 can be used as a changing room for the commercial flight personnel, when the latter are going to rest or resume service after a rest period. The advantage of this changing room is that it makes it possible to undress or dress in comfort because it has a relatively substantial height making it possible to stand upright without having to bend down and provides sufficient freedom of movement. This isolated space 32 therefore provides a comfortable private space for the commercial flight personnel.

FIGS. 9 and 10 show an embodiment of a partitioning mechanism according to this invention. FIG. 10 corresponds to the second configuration of FIGS. 3 and 4. The partitioning mechanism comprises on the one hand a rod 34 mounted near the ceiling of the cabin and referred to as upper rod 34 and on the other hand a flexible curtain 36.

In the embodiments shown on the drawings, the curtain 36 is a flexible curtain that could be made, for example, of fabric or of coated fabric or of flexible synthetic material. However, it also is conceivable to have a curtain 36 made up of rigid elements connected together so that these elements can be in an opened-out position in which they are arranged one beside the other to fully close off a passageway, but they also can assume a folded-back position in which the rigid elements are arranged so as to maximally clear the said passageway. It thus can involve, for example, slats articulated in relation to each other or else slats articulated on the rod. Other embodiments, of course, are conceivable.

Rod 34 is shown in cross section on FIG. 9. It comprises a first C-shaped sectional element 38, a second C-shaped sectional element 40 and fastening cramps 42. The two sectional elements have a similarly shaped section. Both, in the embodiment shown, comprise a generally rectangular-shaped contour with an opening on a large side of the rectangle. The second C-shaped sectional element 40 is dimensioned so as to be able to be positioned inside the first C-shaped sectional element 38 by being able to slide into the latter. As shown on FIG. 10, a slight play preferably remains between the two sectional elements.

Fastening cramps 42 are arranged inside the second C-shaped sectional element 40. These have a heel 44 of more or less rectangular shape adapted to the inside space of the second C-shaped sectional element 40. This heel 44 bears a part projecting beyond the two sectional elements through the opening made in the latter, a hole 46 being provided in the projecting part so as to form an attachment ring for the flexible curtain 36. The latter then comes to be attached in these holes 46 with the aid of fasteners (not shown on the drawings). Likewise, fastening cramps 42 are found inside the first C-shaped sectional element. Their form is identical overall to that of the fastening cramps 42 shown on FIG. 9, but the size of the heel of each is adapted to the inside space of the first sectional element 38.

Rod 34 is equipped at each of its ends with connection means cooperating with complementary means in order to form a pivot connection. In one embodiment, as shown on FIG. 10, the first C-shaped sectional element 38 has at one end a bore 48 intended to cooperate with a vertical-axis cylindrical axis 50 to form a pivot connection. As for the second sectional element 40, it has a cylindrical finger 52 intended to come to fit into a vertical-axis bore arranged on an attachment cramp 54 (affixed on the movable wall 24 of the central island 20 in the example of FIG. 10).

The connection implemented in this way at each end of the rod 34 therefore makes it possible to have the rod 34 pivot and furthermore is removable, which makes it possible to shift the said rod 34. It is assumed that the rod 34 is in a more or less horizontal plane. The pivot connection makes it possible to have the rod pivot in this horizontal plane.

By virtue of the removable nature of the rod 34, it is conceivable to arrange the corresponding flexible curtain 36 when no partitioning of the space is necessary. Advantageously, in this case, the rod 34 comes to be positioned against the monument 28, along the transverse aisle 26. In this position, the partitioning mechanism makes it possible to close off the access to stairs 30, thus forming a barrier making it possible to deter an unauthorized person from going up into the rest space reserved for the commercial flight personnel.

Figure 11:
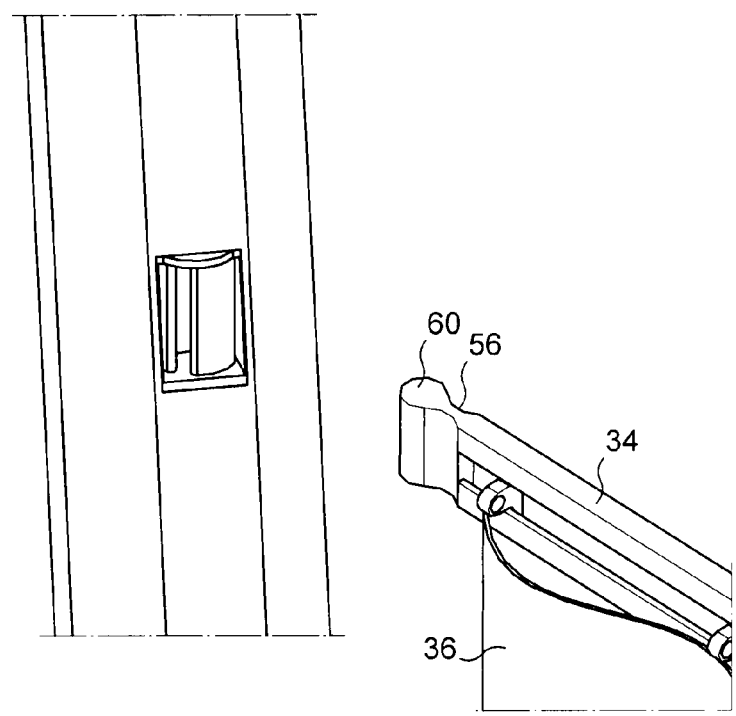
FIG. 11 illustrates an embodiment of a removable connection for the end of a rod of a partitioning mechanism according to this invention.
Figure 12:
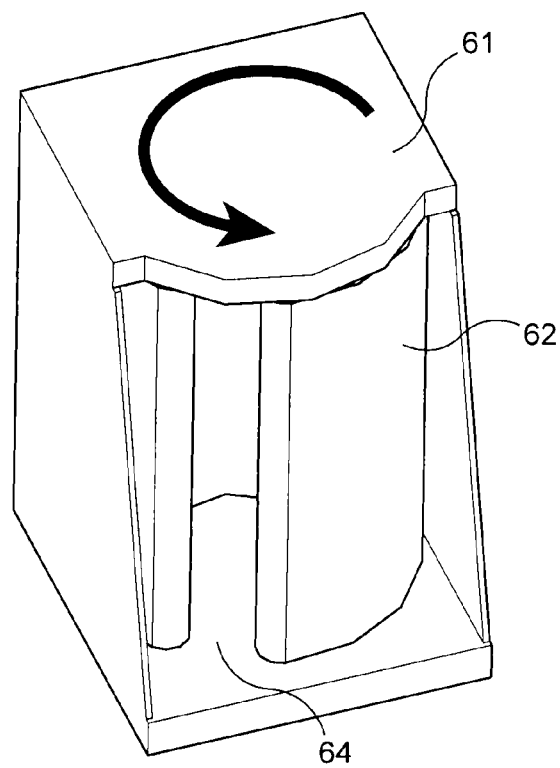
FIG. 12 shows in detail a component used in the connection shown on FIG. 11.

FIGS. 11 and 12 illustrate an embodiment variant allowing connection of one end of the rod 34. In this embodiment variant, the end of the rod 34 has a narrowing 56 that connects the body of the rod to a head 60 of overall circular cylindrical shape. The head 60 is intended to come to be positioned in a rigid housing 61 that is implemented, for example, on the movable partition 24. Inside this rigid housing 61, there is a semi-rigid part 62 that defines an opening 64. The latter expands as soon as the head 60 of the rod 34 is introduced and resumes its initial shape as soon as the head 60 is housed in this semi-rigid part 62. The latter can turn inside the rigid housing 61 so as to be adjusted and be in the extension of the rod 34. This is symbolized in particular by the arrow shown on the rigid housing 61 on FIG. 12.

Rod 34 makes it possible to ensure a good guidance and a good support of the flexible curtain 36 in its upper portion. For support of the flexible curtain 36 at the lower portion, that is to say on the side opposite the rod 34, fastening means (not shown) can be provided. Numerous means may be used here. It concerns, for example, a connection making it possible to fasten the bottom of the flexible curtain 36 to a fixed element. There also may be provided, in place of or in addition to the connection, means for attachment with loops and hooks (known under the registered trademark Velcro), with pressure buttons, magnetic means, or . . . .

Curtain 36 is flexible so as to make it possible to be able to fold it back. However, in order to provide a good partitioning and a good separation, the curtain 36 is, for example, made of fairly thick synthetic material in order to allow a good isolation. Other embodiments indicated above, in particular using rigid elements, also are conceivable.

At the rear of the aircraft, it is possible to provide two partitioning mechanisms as shown on FIGS. 1 to 8. However, it is possible to provide four partitioning mechanisms: two mechanisms arranged, for example, as shown on FIGS. 1 and 2 or on FIGS. 3 and 4 or again on FIGS. 5 and 6, as well as two partitioning mechanisms such as those shown on FIGS. 7 and 8.

This invention is not limited to the embodiments described above by way of non-limitative examples and to the variants indicated. It also relates to embodiment variants within the capacity of the individual skilled in the art in the context of the claims below.

Thus, for example, a partitioning mechanism according to the invention may be positioned not only at the rear of an aircraft but also in other locations of an aircraft. If there is another access to a rest space in the aircraft, partitioning mechanisms may be provided in order to implement, for example, a changing room such as described above.

The invention claimed is:

1. An aircraft comprising:
   At least one adjustable partitioning mechanism, the at least one adjustable partitioning mechanism including
      a rod of adjustable length, the rod including
         a first connection means for allowing the rod to pivot around a first vertical axis at a first end of the rod,
         a second connection means for allowing the rod to pivot around a second vertical axis at a second end of the rod, and
         rod attachment means distributed along a longitudinal extension of the rod; and
      a curtain including curtain attachment means disposed on a first side of the curtain for attaching the curtain to the rod attachment means; and
      first and second complementary connection means for connecting, respectively, to the first and second connection means of the rod, the first complementary connection being disposed on a first structural unit of the aircraft and the second complementary connection means being disposed on a second structural unit of the aircraft,
      wherein, one of the first and second structural units is a movable wall that is movable with respect to the aircraft, and
      wherein, when the movable wall is moved within the aircraft, the rod adjusts in length.

2. The aircraft according to claim 1, wherein the rod is substantially straight.

3. The aircraft according to claim 2, wherein the connection means for allowing the rod to pivot enable pivoting around an axis that is substantially perpendicular to the longitudinal extension of the rod.

4. The aircraft according to claim 1, wherein the rod further includes
   a main C-shaped sectional element, and
   secondary C-shaped sectional element mounted slidingly in the main C-shaped sectional element, and
   wherein the rod attachment means includes fastening cramps, which are mounted slidingly in each of the main and secondary C-shaped sectional elements in order to allow attachment of the curtain.

5. The aircraft according to claim 4, wherein an end of the main C-shaped sectional element corresponds to the first end of the rod having the first connection means, which cooperates with the first complementary connection means to allow the rod to pivot around the first axis, and
   wherein an end of the secondary C-shaped sectional element corresponds to the second end of the rod having the second connection means, which cooperates with the second complementary connection means to allow the rod to pivot around the second axis.

6. The aircraft according to claim 1, wherein the curtain further includes fastening means for fastening the curtain to a floor of the aircraft, the fastening means being arranged on a second side of the curtain, which is opposite the first side of the curtain.

7. The aircraft according to claim 1, wherein at least one of the first and second connection means for the rod is removable so as to be able to shift the rod.

8. The aircraft according to claim 1, wherein the curtain is flexible.

9. The aircraft according to claim 1, further comprising:
   a cockpit;
   a cabin intended to accommodate passengers' a plurality of access doors for access to the cabin, the plurality of access doors including a last access door disposed at a rear end of a fuselage of the aircraft opposite a front end of the fuselage where the cockpit is located; and a space disposed behind the last access door with respect to a longitudinal direction of the fuselage, the space including a central island with the movable wall surrounded by a passageway, wherein the at least one adjustable partitioning mechanism connects the movable wall on the central island to an opposite wall so as to form a partition across the passageway surrounding the central island.

10. The aircraft according to claim 9, wherein one of the first and second ends of the at least one adjustable partitioning mechanism is mounted on the movable wall of the central island.

11. The aircraft according to claim 9, further comprising a monument facing the central island and separated therefrom by a transverse passageway,
   wherein the monument includes stairs for access to a rest compartment, and
   wherein two partitioning mechanisms are provided between the central island and the monument so as to close off the passageway between the central island and the monument at each end thereof.

12. The aircraft according to claim 11, wherein the two partitioning mechanisms are movable so that, in a first position, each partitioning mechanism closes off the passageway between the monument and the central island and, in a second position, each partitioning mechanism folds back along the monument.

13. The aircraft according to claim 1, further comprising a monument including stairs for access to a rest compartment,
   wherein the stairs open into an aisle running alongside the monument, and
   wherein two partitioning mechanisms are provided so as to close off the aisle into which the stairs open at each end of the aisle.

14. The aircraft according to claim 13, wherein the two partitioning mechanisms are movable so that, in a first position, each partitioning mechanism closes off the aisle at each end of the aisle, and, in a second position, each partitioning mechanism folds back along the monument.

15. The aircraft according to claim 4, wherein each fastening cramp includes
   a heel having a shape that corresponds to a shape of a center space within the main or secondary C-shaped sectional elements in which the respective fastening cramp is disposed,
   a projecting part that extends from the heel through an opening in the respective main or secondary C-shaped sectional elements, and
   a through hole disposed in the projecting part via which the curtain is attached to the rod.

* * * * *